United States Patent
Turner et al.

(10) Patent No.: US 11,044,119 B2
(45) Date of Patent: Jun. 22, 2021

(54) DYNAMIC DATA FLOW MANAGEMENT BASED ON DEVICE IDENTITY

(71) Applicant: Charter Communications Operating, LLC, St. Louis, MO (US)

(72) Inventors: Christopher G. Turner, Aurora, CO (US); Andrew Ip, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 9 days.

(21) Appl. No.: 16/024,571

(22) Filed: Jun. 29, 2018

(65) Prior Publication Data

US 2020/0007360 A1  Jan. 2, 2020

(51) Int. Cl.
| | |
|---|---|
| *H04L 12/66* | (2006.01) |
| *H04L 12/28* | (2006.01) |
| *H04L 29/08* | (2006.01) |
| *H04W 88/06* | (2009.01) |
| *H04L 12/24* | (2006.01) |

(52) U.S. Cl.
CPC .......... *H04L 12/66* (2013.01); *H04L 12/2801* (2013.01); *H04L 41/0893* (2013.01); *H04L 67/146* (2013.01); *H04W 88/06* (2013.01)

(58) Field of Classification Search
CPC ....................................................... H04L 12/66
See application file for complete search history.

(56) References Cited

U.S. PATENT DOCUMENTS

| | | | | |
|---|---|---|---|---|
| 2006/0271988 A1* | 11/2006 | Chapman | ............... | H04H 20/78 725/111 |
| 2010/0080202 A1* | 4/2010 | Hanson | ............... | H04L 63/0853 370/338 |
| 2012/0023217 A1* | 1/2012 | Wakumoto | .............. | H04L 47/10 709/223 |
| 2012/0054363 A1* | 3/2012 | Hart | ........................ | H04L 12/66 709/232 |
| 2014/0181274 A1* | 6/2014 | Bazin | .................. | H04L 61/2015 709/220 |
| 2015/0117234 A1* | 4/2015 | Raman | ................ | H04L 43/0829 370/252 |
| 2015/0186949 A1* | 7/2015 | Smits | .................. | G06Q 30/0269 705/14.66 |
| 2018/0213444 A1* | 7/2018 | Khawand | .............. | H04W 28/24 |

\* cited by examiner

*Primary Examiner* — Kevin M Cunningham
(74) *Attorney, Agent, or Firm* — Armis IP Law, LLC

(57) ABSTRACT

A router device in a subscriber domain receives communications from a communication device. The communications are destined for delivery over a first network operated by a corresponding service provider to a destination in a second network such as the Internet. To convey communications, the router device maps a network address obtained from the first communications to a corresponding marker assigned to the communication device. The router device then tags the communications from the communication device with the corresponding marker and forwards the tagged communications (with the marker) over the first network to the second network. The first network operated by the service provider conveys the tagged communications in accordance with a data delivery policy as indicated by the corresponding marker in the forwarded communications.

21 Claims, 10 Drawing Sheets

DYNAMIC DATA FLOW MANAGEMENT BASED ON DEVICE IDENTITY

BACKGROUND

As is well known, conventional communication systems typically include one or more network routers operable to provide one or more computer devices access to a remote network. For example, a communication device initially connects to a network router such as a wireless access point. The network router is able to identify at least a MAC (Media Access Control) of the device. In certain instances, the network router is also able to identify a host name assigned to the communication device. Unfortunately, the host name of the communication device and/or MAC address may not be very useful to identify the type of data flow service that should be provided by the network router to the communication device.

In a separate field of endeavor, conventional communication device fingerprinting technology is available to examine network traffic. Various protocols and behaviors of the communication device can be analyzed to produce an accurate identification of the computer device (such as Vendor, Model, Operating system, etc).

BRIEF DESCRIPTION OF EMBODIMENTS

This disclosure includes the observation that conventional techniques of routing data traffic suffer from deficiencies. For example, conventional solutions of providing data flow services for individual devices in the home must rely on IP:port combinations to send all traffic destined for a specific IP:port from the home to an appropriate service flow assigned to the communication device.

In contrast to conventional techniques, embodiments herein provide novel ways of providing different service flows to each of multiple communication devices in a subscriber domain.

More specifically, in one embodiment, a router device receives first communications from a communication device. The first communications originating from the communication device are destined for delivery over a first network (such as a network in which the router device resides) to a destination address in a second (remote) network. In one embodiment, if the communication device has not yet been assigned a data delivery policy, the router device forwards the first communications (or portion thereof) to an identity analyzer resource for analysis.

As its name suggests, the identity analyzer resource identifies attributes of the communication device and produces feedback of same. Based on the identified attributes indicated in the feedback, a service flow manager resource (such as an access control system receiving the feedback) selects a marker from multiple available markers depending on a data flow service to be provided to the communication device. As further described herein, embodiments further include creating a map that maps a network address of the communication device to the selected marker.

The selected marker (value) indicates a corresponding data delivery policy to be used to route data packets from the communication device.

Using the map, the router device in the subscriber domain tags the first communications (and/or subsequent communications from the communication device) with the selected marker (indicating an assigned data delivery policy) and forwards the tagged communications over the first network (such as the service provider's network) to the second network.

In one embodiment, tagging the communications from the communication device with the marker includes: inserting a copy of the selected marker assigned to the communication device in a data field of the respective communications to be communicated to the remote network (second network). The data field is accessible to communication resources (router components) in the first network that route the tagged first communications at a session level in accordance with the assigned data delivery policy. In other words, the selected marker maps to a corresponding data delivery policy assigned to a data traffic flow to be provided to the communication device. Thus, via the marker in the conveyed communications, other router components in the first network are able to identify a corresponding appropriate data flow service to be provided to the communications.

The first network (as controlled by a respective service provider) conveys the tagged communications from the communication device over the first network in a manner as specified by the corresponding data delivery policy assigned to the selected marker in the tagged communications. For example, the router components in the first network can be configured to analyze the conveyed communications (such as data packets) for the marker. The router components control forwarding of the tagged communications over a respective data flow based on the marker included in the tagged communication.

In accordance with still further embodiments, the second network ignores the selected marker included in respective communications.

Note that, in a reverse direction, embodiments herein can include receiving second communications (reply data packets) from the second network in response to conveyance of the tagged communications to the destination. The second communications are destined for delivery to the communication device.

In one embodiment, each of the second communications includes the selected marker as well. The first network and corresponding router components forward (conveys) the second communications over the first network in accordance with a policy as indicated by the marker.

In accordance with yet further embodiments, the communication device is one of multiple communication devices in a subscriber domain that are provided different data flows. The router device (or other suitable resource) can be configured to provide a different corresponding service flow (data traffic flow) to each of the multiple communication devices in the subscriber domain depending on a respective marker assigned to each of the communication devices.

Note that the first network and second network can be or include any suitable type of network. For example, in one embodiment, the first network includes a DOCSIS (Data Over Cable Service Interface Specification) communication system. The components (such as routers, switches, etc.) in the first network control conveyance of the tagged first communications over the DOCSIS communication system in a manner as specified by the corresponding policy associated with the selected tag.

The second network can be the Internet, wireless network, etc.

If desired, the mapping of identities of communication devices to respective markers can be configured to indicate multiple different markers (such as a first marker, second marker, etc.) assigned to a single respective communication device. As an example of using the multiple markers, assume that the respective communication device is able to request different types of communication links (such as a non-voice link, voice link, etc.). In one embodiment, mapping of a network address obtained from the first communications to the marker assigned to the communication device can include: identifying a network address of the respective communication device as well as receiving attributes of a type of communication link requested by the communication device. To support the requested communication link and appropriate data flow service, the router device selects an appropriate marker (from multiple available markers assigned to the communication device). For example, the appropriate marker can be selected based at least in part on the identified attributes of the requested type of communication link.

Thus, in one embodiment, if a communication device requests to establish a voice link, the router device can be configured to tag messages with a first marker (which maps to a corresponding first data delivery policy appropriate for voice communications) to provide a first data flow service to the communication device. If the communication device requests to establish a non-voice link, the router device can be configured to tag messages with a second marker (which maps to a corresponding second data delivery policy appropriate for non-voice communications) to provide a second data flow service to the communication device.

Further embodiments herein include modifying a respective data flow service assigned to a communication device based on received input. For example, assume that a respective marker (tag) and corresponding data delivery policy is initially assigned to the communication device. As previously discussed, assume that the respective marker corresponds to a first data delivery policy. The communication system as described herein can be configured to receive a request from a user of the communication device (or request or command from any other suitable resource) to upgrade (or downgrade) a current data delivery policy (assigned data flow) provided to the communication device. In response to receiving the request to change the data delivery policy assigned to the communication device, the communication system modifies a current tag value (marker) to be a second tag value. The second tag value maps the communication device to a second data delivery policy (as specified by the second marker) instead of the first data delivery policy to provide the communication device with an upgraded (or downgraded) delivery service.

In accordance with further embodiments, the first network can be configured to include a first communication path and a second communication path. In accordance with a corresponding data delivery policy assigned to the marker, which is assigned to the communication device, router components in the first network control conveyance of the first communications over the first communication path and the second communication path between the communication device and the second network. In one embodiment, the first communication path is a wireless link between the communication device and a router device (such as wireless access point) in the first network; the second communication path extends between the router device and a gateway providing access to the second network.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to manage data flow services associated with one or more communication devices in network environment. The instructions, when executed by computer processor hardware, cause the computer processor hardware (such as one or more co-located or disparately processor devices) to: receive first communications from a communication device, the first communications destined for delivery over a first network to a destination in a second network; mapping a network address obtained from the first communications to a marker assigned to the communication device; tag the first communications with the marker; and forward the tagged first communications over the first network to the second network.

Another embodiment includes a computer readable storage medium and/or system having instructions stored thereon to manage data flow services associated with one or more communication devices in network environment. The instructions, when executed by computer processor hardware, cause the computer processor hardware (such as one or more co-located or disparately processor devices) to: receive first communications from a communication device in a local network, the first communications destined for delivery to a destination address in a remote network; identify attributes of the communication device based on data in the first communications; assign a tag value to the communication device based on the identified attributes; and insert the tag value into second communications from the communication device prior to forwarding of the second communications over the local network to the remote network.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As further discussed herein, techniques herein are well suited for use in the field of supporting different data traffic flows to different communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
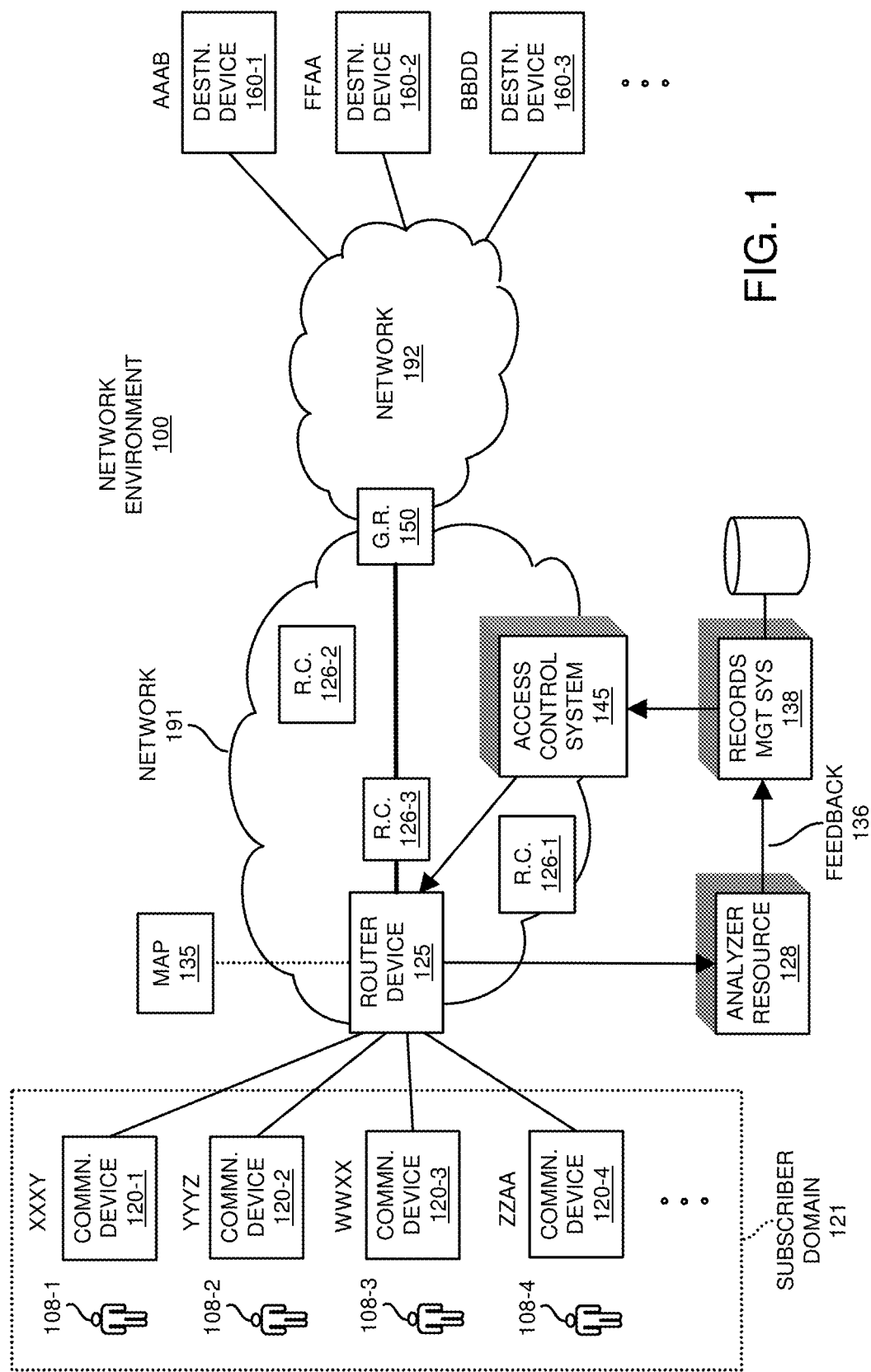
FIG. 1 is an example diagram illustrating a network environment providing different data flow services to different communication devices according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include marking data traffic for different treatment. The markings in the data traffic (data packets) are used by upstream routing systems to differentiate traffic for various reasons such as quality of service, accounting, routing, etc. To provide appropriate data traffic flow to the different communication devices in a subscriber domain, embodiments herein include differentiating traffic originating from the different devices in the subscriber domain (such as home environment). For example, traffic from a gaming console is marked with a first marker value (tag value) to provide low latency service; traffic from a glucose monitor device is marked with a second marker value (tag value) to provide a secure connection to a healthcare provider; and so on.

One way to determine what marker to apply to the different data traffic in a respective service provider's network is to implement analyzer technology to determine attributes of each communication device in a subscriber domain. Using fingerprinting techniques, the analyzer resource identifies attributes such as Vendor, Model, Operating System, etc., associated with each of the communication devices in the subscriber domain. An access control system assigns an appropriate marker and corresponding data delivery policy to each of the communication devices. During use of a respective communication device, a router device managing traffic from the communication devices in the subscriber domain inserts the appropriate marker in communications (such as data packets) from the respective communication device. The service provider's network uses the markers in the communications to provide data flow services as specified by the marker.

Now, more specifically, FIG. 1 is an example diagram illustrating a network environment supporting different data flow services to different communication devices according to embodiments herein.

As shown, in this example embodiment, network environment 100 includes subscriber domain 121, network 191 (local network such as a service provider network to which the users 108 subscribe), and network 192 (remote network). Subscriber domain 121 includes multiple users 108-1, 108-2, 108-3, 108-4, etc., (collectively, users 108) that operate respective communication devices 120-1, 120-2, 120-3, 120-4, etc.

In this example embodiment, user 108-1 operates communication device 120-1; user 108-2 operates communication device 120-2; user 108-3 operates communication device 120-3; user 108-4 operates communication device 120-4; and so on.

Further in this example embodiment, network 191 includes resources such as router device 125, gateway resource 150, router components 126-1, router component 126-2, router component 126-3, etc. The combination of resources in the first network 191 facilitates conveyance of communications between the communication devices 120 and the second network 192.

Note that each of the communication devices 120 is communicatively coupled to the router device 125 via any suitable type of communication link. More specifically, in one embodiment, each of one or more of the communications devices 120 is communicatively coupled to the router device 125 via a respective wireless communication link. Additionally or alternatively, each of one or more of the communication devices 120 is communicatively coupled to the router device 125 via a wired communication link.

As previously discussed, the resources (such as router device 125, router components 126, gateway resource 150, etc.) in network 191 facilitate delivery of respective communications from the communication devices 120 upstream from the router device 125 to and through the gateway resource 150 to network 192, where the communications are then delivered via router components in the network 192 to the appropriate destination devices 160 (destination device 160-1, destination device 160-2, destination device 160-3, etc.).

In a (reverse) downstream direction, the destination devices 160 communicate one or more reply communications (such as data packets, messages, etc.) through the network 192 to the gateway resource 150. Gateway resource 150 communicates the downstream communications from the one or more destination devices 160 through the network 191 to the router device 125 that, in turn, delivers the reply communications to the appropriate communication device.

In one embodiment, the resources (such as router device 125, router components 126, gateway resource 150, etc.) in network 191 are controlled and/or operated by a respective service provider that provides users 108 (subscribers) in subscriber domain 121 access to the remote network 192 such as the Internet. The head of household in subscriber domain 121 may pay a fee to provide users 108 in the subscriber domain 121 access the second network 192 via network 191.

In accordance with further embodiments, as shown, the first network 191 can be configured to include first communication paths (such as a first communication link between communication device 120-1 and the router device 125, a second communication link between the communication device 120-2 and the router device 125, a third communication link between the communication device 120-3 and the router device 125, and so on). Network 191 includes a second communication path between router device 125, router component 126-3, and the gateway resource 150.

Note that the first network 191 and second network 192 can be or include any suitable type of network.

For example, by way of non-limiting example embodiment, the first network 191 includes a DOCSIS (Data Over Cable Service Interface Specification) communication system. More specifically, router component 126-3 is optionally a cable modem; gateway resource 150 is optionally a cable modem termination system. In such an instance, the router components 126 (such as routers, switches, etc.) in first network 191 control conveyance of tagged communications over the DOCSIS communication system in a manner as specified by the corresponding policy associated with the selected tag.

Additionally or alternatively, network 191 also can be or include a fiber network, LTE (Long Term Evolution) network, etc.

As further shown, the network environment 100 can be configured to include analyzer resource 128 and record management system 138. During operation, the router device 125 (such as a wireless access point, base station, etc.) receives first communications from, for example, a communication device 120-1. Assume that the first communications from the communication device 120-1 are destined for delivery over network 191 to a destination address AAAB in a second network 192. In one embodiment, the router device 125 intercepts and forwards a copy of the first communications (or portion thereof) to the identity analyzer resource 128 for analysis. The first communications include information indicating attributes of the communication device 120-1 sending the first communications.

In one embodiment, the first communications from the communication device 120-1 are part of or are associated with a DHCP (Dynamic Host Configuration Protocol) request from the communication device 120-1 to a respective server in network environment 100 to obtain an IP (Internet Protocol) address from a DHCP server located in network 191 or network 192. The recipient server dynamically assigns an IP address and other network configuration parameters to the requesting device so it is able to communicate with other IP networks. Accordingly, although the communications conveyed from the router device 125 to the analyzer resource 128 can include any suitable messages, in one embodiment, communications forwarded from the router device 125 to the analyzer resource 128 can include communications from the communication device 160-1 to obtain an IP address.

As its name suggests, the identity analyzer resource 128 analyzes received communications originating from a respective communication device to identify attributes of the respective communication device. Based on the identified attributes (such as Vendor, Model, Operating System, network address, etc.) associated with the respective communication device, the analyzer resource 128 notifies the records management system 138 operated by the service provider.

In one embodiment, the records management system 138 (service provider's back office) keeps track of the different types of communication devices used in the subscriber domain 121 as indicated by the analyzer resource 128. In other words, based upon feedback 136 received from the analyzer resource 128, the records management system 138 updates corresponding records associated with the subscriber domain 121 to indicate corresponding used devices.

Note that network environment 100 further includes access control system 145. Based on attributes of the communication device 120-1 as indicated by the analyzer resource 128, and/or input from the records management system 138, the access control system 145 (service flow manager resource) selects an appropriate marker from multiple available markers depending on a data flow service to be provided to the communication device 120-1. In one embodiment, the communication devices can be assigned different data flow services depending on a type of subscription purchased by the head of household in the subscriber domain 121.

Subsequent to making a selection, the access control system 145 notifies the router device 125 of a marker and corresponding data delivery policy to be assigned to communications from the communication device 120-1.

Any suitable resource (such as router device 125, access control system 145, records management system 138, etc.) in the network environment 100 creates a map 135.

In order to create map 135, in one embodiment, in a similar manner as previously discussed, the router device 125 forwards communications associated with each of the communication devices 120 to the analyzer resource 128. The analyzer resource 128 notifies the record management system 138 of the attributes associated with the communication devices operated in the subscriber domain 121. The access control system 145 (or records management system 138 or other suitable resource) assigns one or more of the multiple available markers (each corresponding to a data delivery policy) to each communication device for inclusion in map 135.

Accordingly, the access control system 145 and router device 125 associated with the subscriber domain 121 can be configured to assign an appropriate or different corresponding service flow (data flow) to each of the multiple communication devices 120 in the subscriber domain via assignment of an appropriate marker or tag value to each of the communication devices 120.

Figure 2:
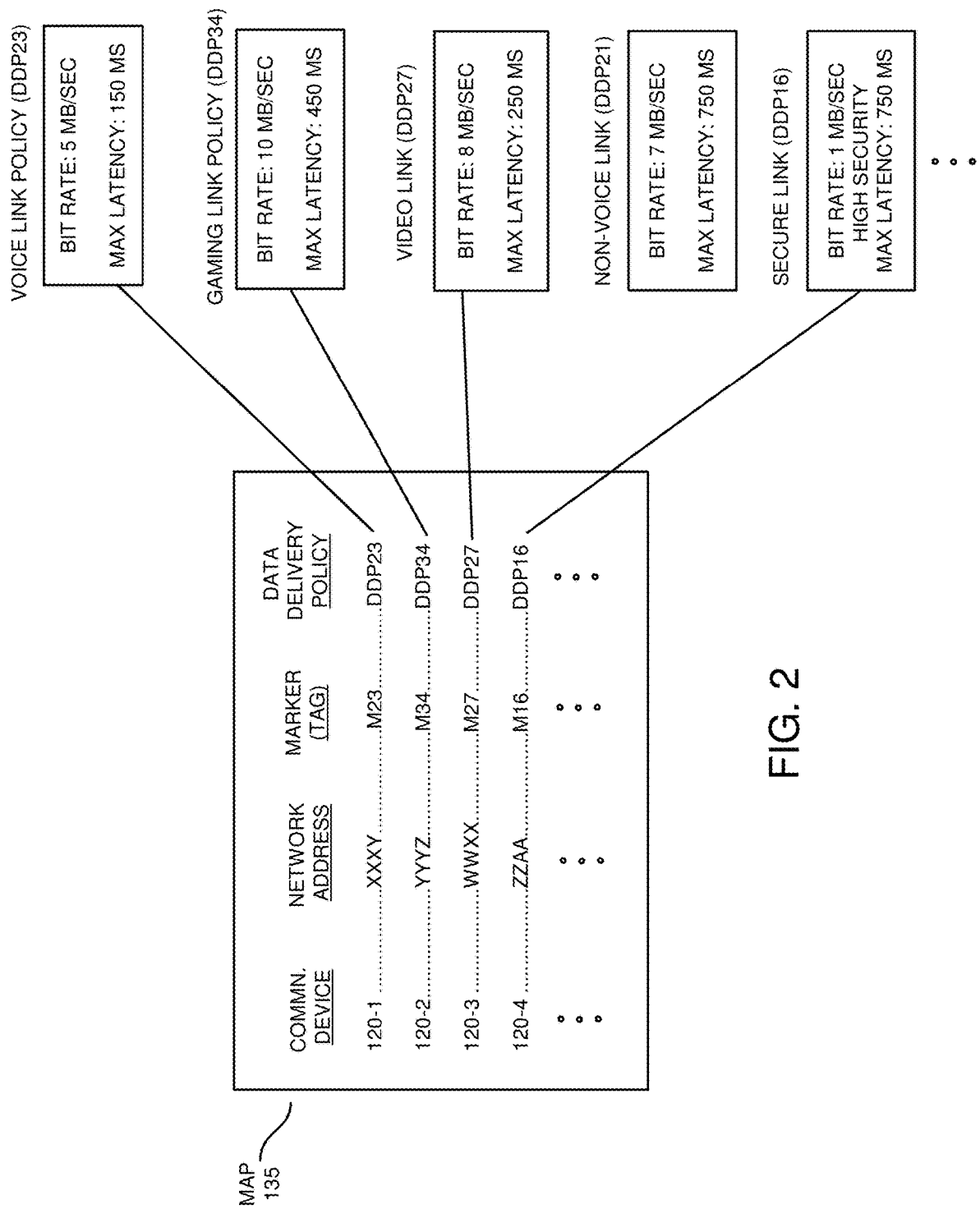
FIG. 2 is an example diagram illustrating a mapping of communication device identities to corresponding data delivery policies according to embodiments herein.

As further shown in FIG. 2, the map 135 indicates a mapping of a respective communication device to a respective data delivery policy. For example, map 135 indicates that communication device 120-1 (such as a mobile phone device as determined by the analyzer resource 128) having a network address of XXXY has been assigned marker (tag) M23. Assignment of the marker M23 indicates that the network 191 and corresponding components are to apply data delivery policy DDP23 to communications to and/or from the communication device 120-1. In this example embodiment, data delivery policy DDP23 indicates attributes of a corresponding data delivery policy to be applied to the communications. For example, data delivery policy DDP 23 indicates to provide a suitable data service flow that supports voice communications such as a data flow bit rate of 5 MB (MegaBytes) per second and maximum latency of up to 150 milliseconds.

Further in this example embodiment, map 135 indicates that communication device 120-2 (such as a gaming device as determined by the analyzer resource 128) having a network address of YYYZ has been assigned marker (tag) M34. Assignment of the marker M34 indicates that the network 191 and corresponding components are to apply data delivery policy DDP34 to communications to and/or from the communication device 120-2. In this example embodiment, data delivery policy DDP34 indicates attributes of a corresponding data delivery policy to be applied to the communications. For example, data delivery policy DDP34 indicates to provide a suitable data service flow that supports voice communications such as a data flow bit rate of 10 MB (MegaBytes) per second and maximum latency of up to 450 milliseconds.

Further in this example embodiment, map 135 indicates that communication device 120-3 (such as a video playback device as determined by the analyzer resource 128) having a network address of WWXX has been assigned marker (tag) M27. Assignment of the marker M27 indicates that the network 191 and corresponding components are to apply data delivery policy DDP27 to communications to and/or from the communication device 120-3. In this example embodiment, data delivery policy DDP27 indicates attributes of a corresponding data delivery policy to be applied to the communications. For example, data delivery policy DDP27 indicates to provide a suitable data service flow that supports video communications such as a data flow bit rate of 8 MB (MegaBytes) per second and maximum latency of up to 250 milliseconds.

Further in this example embodiment, map 135 indicates that communication device 120-4 (such as a personal medical device as determined by the analyzer resource 128) having a network address of ZZAA has been assigned marker (tag) M16. Assignment of the marker M16 indicates that the network 191 and corresponding components are to apply data delivery policy DDP16 to communications to and/or from the communication device 120-4. In this example embodiment, data delivery policy DDP16 indicates attributes of a corresponding data delivery policy to be applied to the communications. For example, data delivery policy DDP16 indicates to provide a suitable data service flow that supports video communications such as a data flow bit rate of 1 MB (MegaBytes) per second and maximum latency of up to 750 milliseconds. Note that the data delivery policy can include any additional parameter such as a level of security to be provided to the respective communications from communication device 120-4.

Referring again to FIG. 1, via information in map 135, the router device 125 tags communications from the communication device 160-1 using an appropriate assigned marker prior to forwarding of the respective communications through network 191.

If desired, note that in alternative embodiments, each of the communication devices 120 can be configured to know its assigned marker. For example, communication device 120-1 can be notified (such as via communications from the router device 125 or other suitable resource) that communication device 120-1 is assigned marker M23; communication device 120-2 can be notified (such as via communications from the router device 125 or other suitable resource) that communication device 120-2 is assigned marker M34; communication device 120-3 can be notified (such as via communications from the router device 125 or other suitable resource) that communication device 120-3 is assigned marker M27; communication device 120-4 can be notified (such as via communications from the router device 125 or other suitable resource) that communication device 120-4 is assigned marker M16; and so on.

In such an instance, in one embodiment, each of the communication devices can be configured to insert the assigned marker in an appropriate data field of any communications conveyed over the communication link between the respective communication device and the router device 125.

For example, communication device 120-1 can be configured to insert marker M23 in a designated data field of communications transmitted communication device 120-1 over network 191 to network 192; communication device 120-2 can be configured to insert marker M34 in a designated data field of communications transmitted from communication device 120-2 over network 191 to network 192; communication device 120-3 can be configured to insert marker M27 in a designated data field of communications transmitted from communication device 120-3 over network 191 to network 192; communication device 120-4 can be configured to insert marker M16 in a designated data field of communications transmitted from communication device 120-4 over network 191 to network 192; and so on.

In such an instance, the router device 125 is alleviated from having to insert the assigned marker into respective communications from the communication devices 120.

As previously discussed, the resources in the network 191 collectively provide a data traffic service flow as specified by an assigned marker and corresponding data delivery policy to any data traffic transmitted from and conveyed to the communication device.

The following example discussion will refer to FIGS. 2, 3, 4, and 5.

Figure 3:
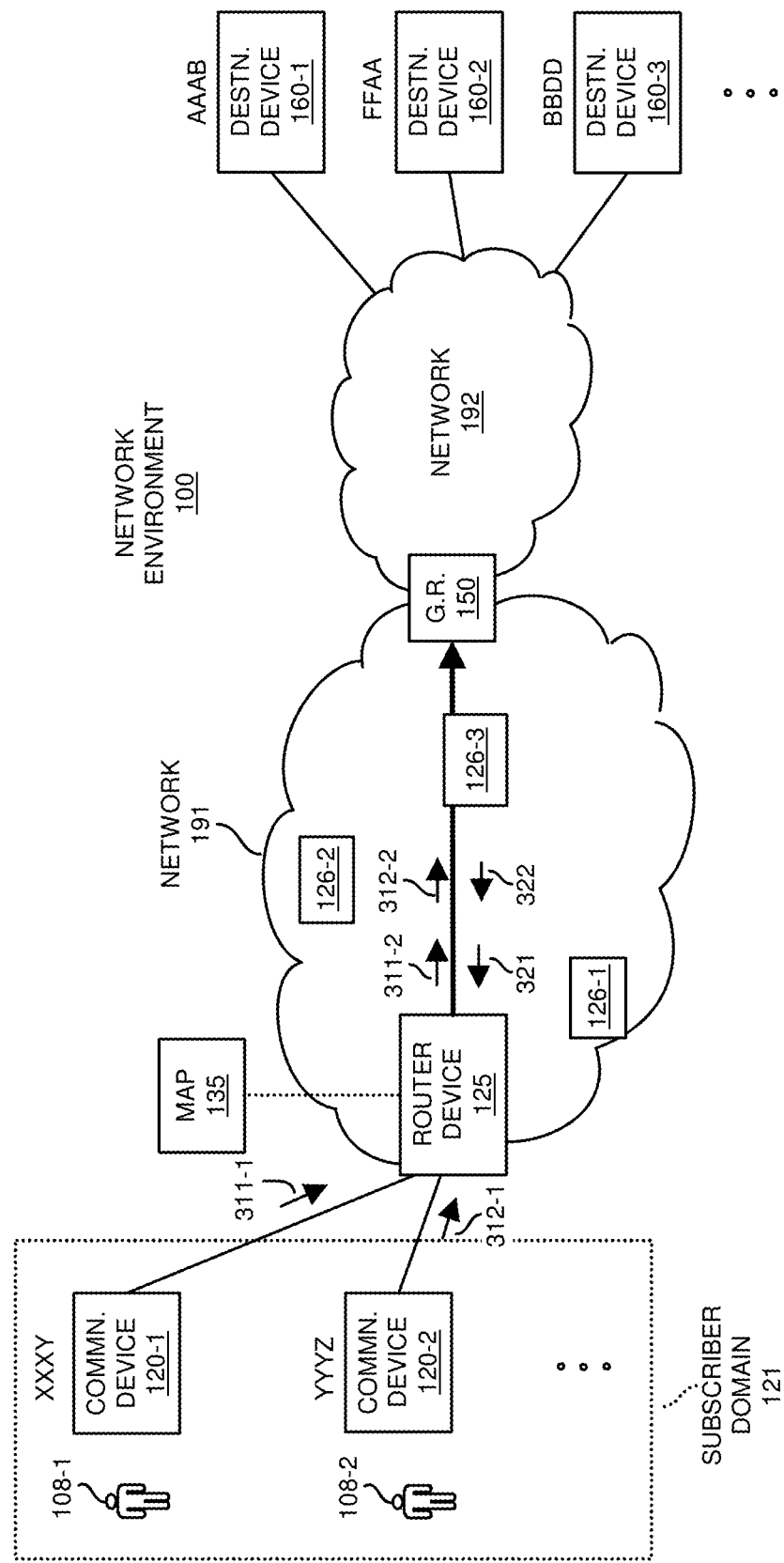
FIG. 3 is an example diagram illustrating implementation of different data flows provided to different communication devices according to embodiments herein.

Note that FIG. 3 is an example diagram illustrating instantiation of different data flows for different communication devices according to embodiments herein.

Figure 4:
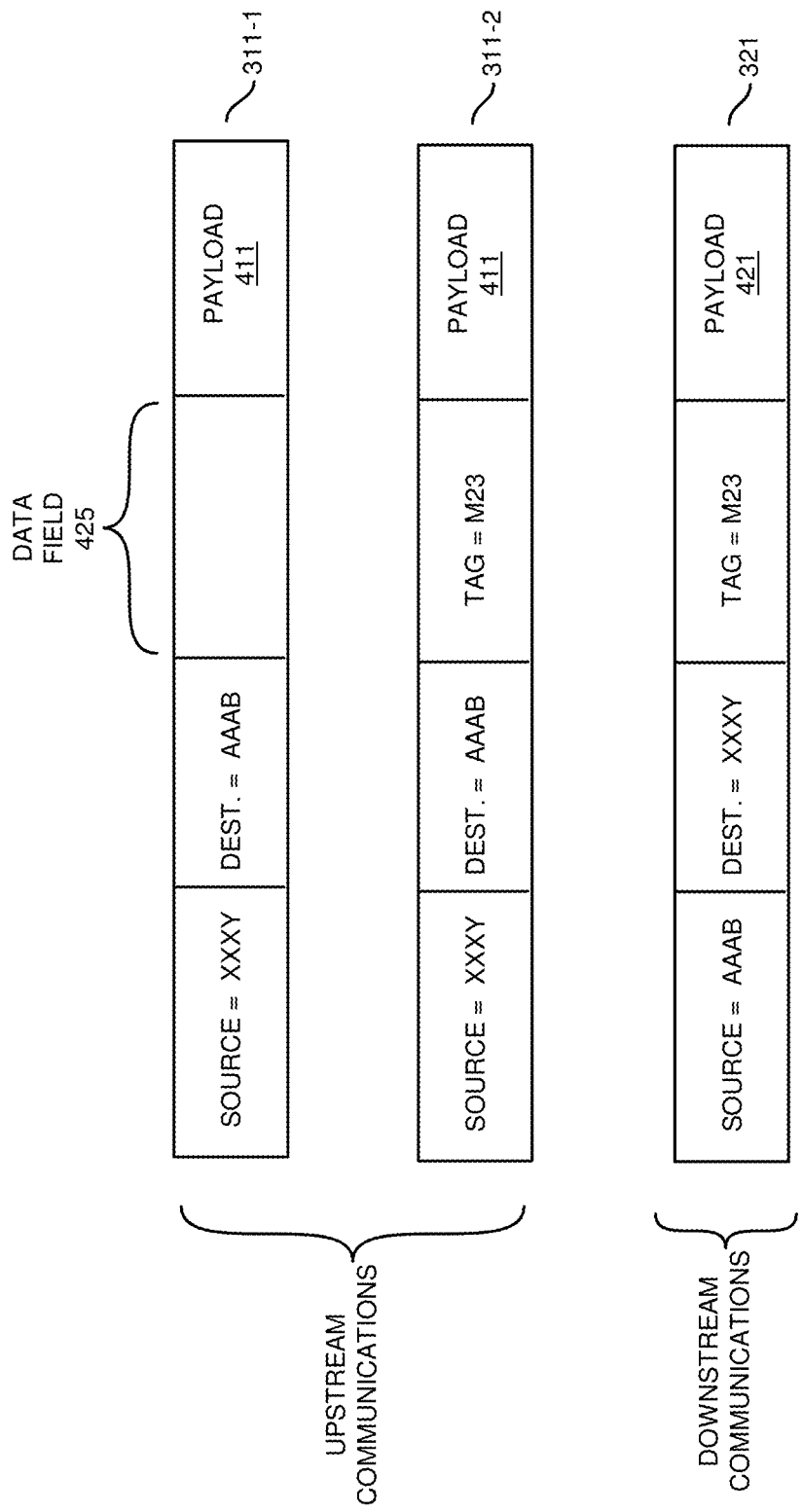
FIG. 4 is an example diagram illustrating inclusion of an appropriate tag value in communications from a first communication device to control delivery of the communications over a first network according to embodiments herein.

FIG. 4 is an example diagram illustrating inclusion of an appropriate tag value into each communication from a first communication device to control delivery of communications according to embodiments herein.

Figure 5:
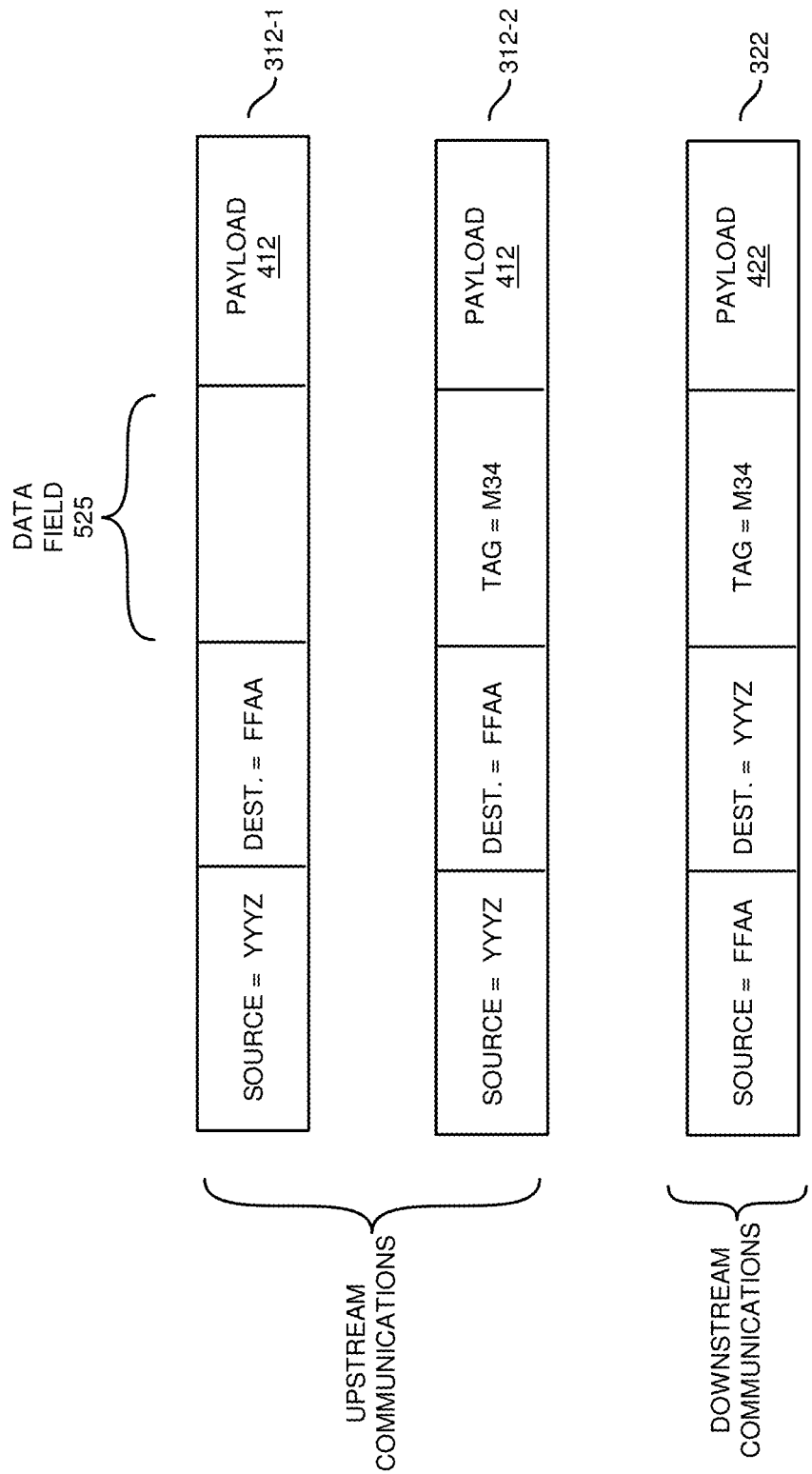
FIG. 5 is an example diagram illustrating inclusion of an appropriate tag value in communications from a second communication device to control delivery of communications over a first network according to embodiments herein.

FIG. 5 is an example diagram illustrating inclusion of an appropriate tag value for each communication from a second communication device to control delivery of communications according to embodiments herein.

In this example embodiment, as shown in FIG. 3, the router device 125 receives communication 311-1 (such as a data packet) from the communication device 120-1. As further shown in FIG. 4, the received communication 311-1 indicates a destination address of AAAB assigned to destination device 160-1 such as a server resource. The router device 125 inspects the source address associated with communication 311-1 and determines that the source network address is XXXY, indicating that the communication device 120-1 originated and transmitted the communication 311-1.

Using the map 135, the router device 125 maps the network address XXXY of the communication device 120-1 to assigned marker M23 and corresponding data delivery policy DDP23. The router device 125 inserts the tag or marker M23 into corresponding data field 425 of the communication 311-1 to produce the communication 311-2 (FIG. 4).

As shown in FIG. 3, the router device 125 forwards the communication 311-2 over a voice data flow upstream through network 191 to the gateway resource 150. As previously discussed, based on marker M23, the network 191 and corresponding router components convey the communication 311-2 in accordance with the corresponding data delivery policy DDP23.

Gateway resource 150 forwards the received communications 311-2 over network 192 to the destination device 160-1. In one embodiment, the second network 192 ignores the selected marker M23 included in communication 311-2 conveyed over network 192.

As a response to the communication 311-2, destination device 160-1 produces reply communications 321 that are conveyed from device 160-1 through network 192 and network 191 over the voice data flow downstream to the communication device 120-1.

In one embodiment, the communications 321 also include the tag value of M23, which is used by the components in network 191 to convey the corresponding communication 321 in a manner as indicated by the data delivery policy DDP23.

Further in this example embodiment, the router device 125 receives communication 312-1 (such as a data packet) from the communication device 120-2. As further shown in FIG. 5, the received communication 312-1 indicates a destination address of FFAA assigned to destination device 160-2 such as a server resource. The router device 125 inspects the source address associated with communication 312-1 and determines that the source network address is YYYZ, indicating that the communication device 120-2 originated and transmitted the communication 312-1.

Using the map 135, the router device 125 maps the network address YYYZ to assigned marker M34 and corresponding data delivery policy DDP34. The router device 125 inserts the tag or marker M34 into corresponding data field 525 of the communication 312-1 to produce the communication 312-2 (FIG. 4).

As shown in FIG. 3, the router device 125 forwards the communication 312-2 over a gaming link data flow upstream through network 191 to the gateway resource 150. As previously discussed, based on marker M34, the network 191 and corresponding router components convey the communication 312-2 in accordance with the corresponding data delivery policy DDP34.

Gateway resource 150 forwards the received communications 312-2 over network 192 to the destination device 160-2. In one embodiment, the second network 192 ignores the selected marker M34 included in communication 312-2 conveyed over network 192.

As a response to the communication 312-2, destination device 160-2 produces reply communications 322 that are conveyed from device 160-2 over a gaming link data flow through network 192 and network 191 downstream to the communication device 120-2. In one embodiment, the communications 322 also include the tag value of M34, which is used by the components in network 191 to convey the corresponding communication 322 in a manner as indicated by the data delivery policy DDP34.

Figure 6:
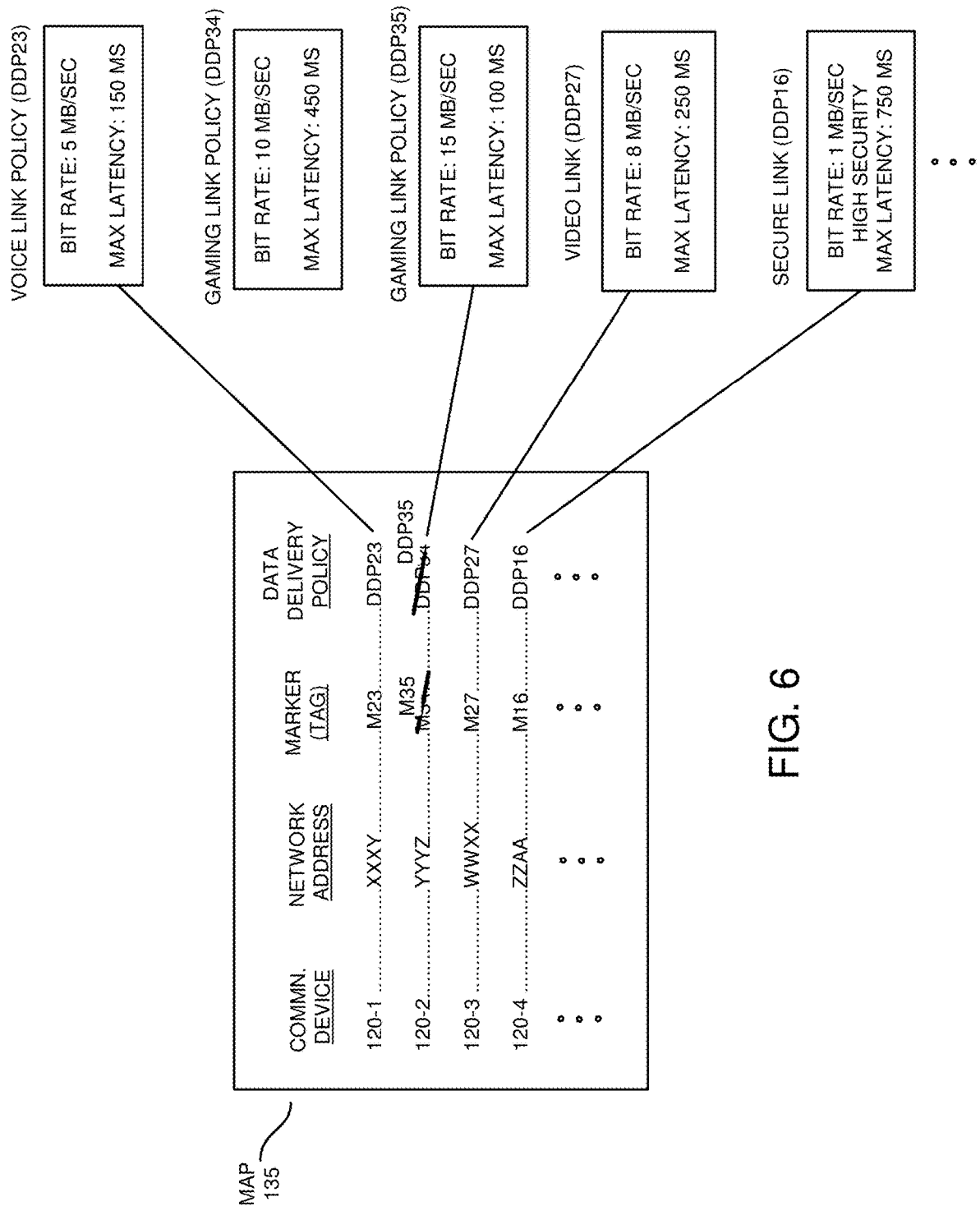
FIG. 6 is an example diagram illustrating modification of a marker in a map to change a data delivery policy assigned to a communication device according to embodiments herein.

FIG. 6 is an example diagram illustrating modification of a map and corresponding data delivery policy assigned to a communication device according to embodiments herein.

Further embodiments herein include upgrading a respective data flow service assigned to a communication device.

For example, assume that a respective marker (tag) M34 is initially assigned to the communication device 120-2 in a manner as previously discussed. The marker M34 may represent a default marker assigned to gaming devices. As previously discussed, the respective marker M34 corresponds to a data delivery policy DDP34.

Note that a communication system as described herein can be configured to receive a request from a user 120-2 of the communication device 120-2 (or a request or command from another suitable resource) to upgrade (or downgrade) a delivery policy assigned to the communication device 120-2.

In response to receiving a request or command to modify the current data delivery policy assigned to the communication device 120-2, the router device 125 or other suitable resource in the communication system modifies map 135 to change the marker assigned to the communication device 120-2.

For example, assume that the router device 125 receives notification to upgrade the service provided to the communication device 120-2 to data delivery policy DDP35. In such an instance, as shown in FIG. 6, the router device 125 replaces the marker M34 in the map 135 with the marker M35 to indicate that the communication device 120-2 is now assigned data delivery policy DDP35 instead of data delivery policy DDP34. This provides the communication device 120-2 and corresponding communications an upgraded data delivery policy.

In a similar manner, the map 135 can be modified to replace the marker M35 with the marker M34 to downgrade a respective data delivery policy applied to communications from the communication device 120-2.

Figure 7:
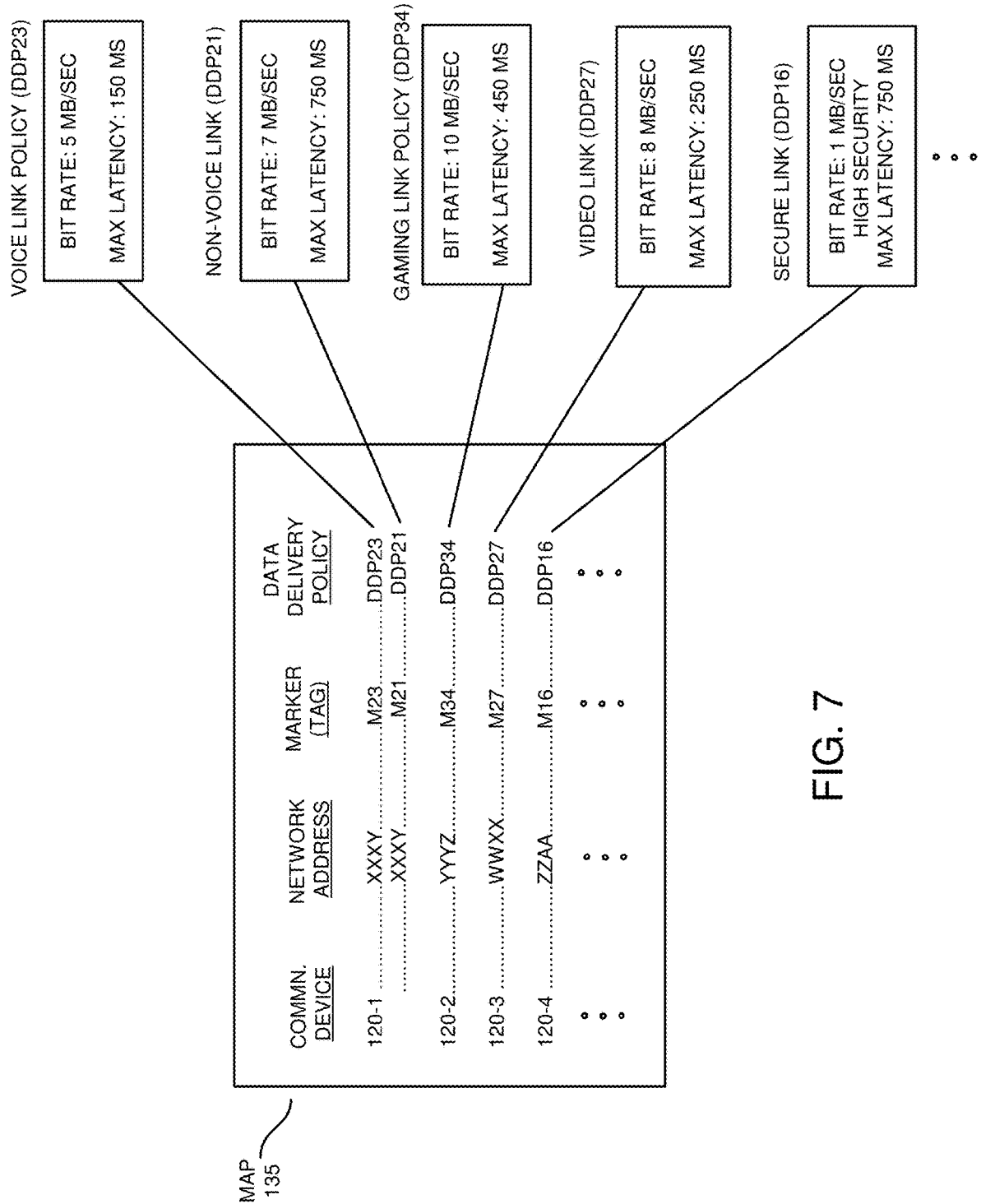
FIG. 7 is an example diagram illustrating assignment of multiple markers and corresponding data delivery policies to a respective communication device according to embodiments herein.

FIG. 7 is an example diagram illustrating assignment of multiple data delivery policies to a respective communication device according to embodiments herein.

If desired, the map 135 of markers can be configured to indicate multiple different markers (such as a first marker, second marker, etc.) assigned to a respective communication device. For example, communication device 120-1 may be identified by the analyzer resource 128 as being a mobile phone device supporting both voice communications and non-voice (such as so-called data) communications. Thus, the respective communication device 120-1 is able to operate in different modes and request different types of communication links (such as a non-voice link, voice link, etc.).

In this example embodiment, in response to the analyzer resource 128 detecting that the communication device 120-1 is a mobile phone device capable of being operated in multiple different communication modes supporting voice communications and non-voice communications, the access control system 145 or other suitable resource assigns the markers M23 (corresponding to data delivery policy DDP23) and M21 (corresponding to data delivery policy DDP21) to the communication device 120-1 as shown in map 135 of FIG. 7.

In one embodiment, when the communication device 120-1 establishes a respective communication link with the router device 125, the router device 125 uses map 135 to identify an appropriate marker to tag communications from the communication device 120-1.

More specifically, in one embodiment, the router device 125 identifies a network address XXXY of the communication device 120-1 (via communications from the communication device 120-1). The router device also receives notification of a type of communication link requested by or being established by the communication device 120-1.

To support the requested communication link, the router device 125 selects an appropriate marker (from multiple available markers M23 and M21 assigned to the communication device 120-1). The appropriate marker is selected based at least in part on the identified attributes of the type of communication link being established. Thus, if a communication device 120-1 requests to establish a voice link, the router device 125 tags messages from the communication device 120-1 with marker M23 (which maps to corresponding data delivery policy DDP23 for voice communications) to provide a first data flow service to the communication device 120-1.

If the router device 125 detects that the communication device 120-1 requests to establish a non-voice link, the router device 125 tags communications from the communication device 120-1 with marker M21 (which maps to corresponding data delivery policy DDP21 for non-voice communications) to provide a second data flow service to the communication device 120-1.

Figure 8:
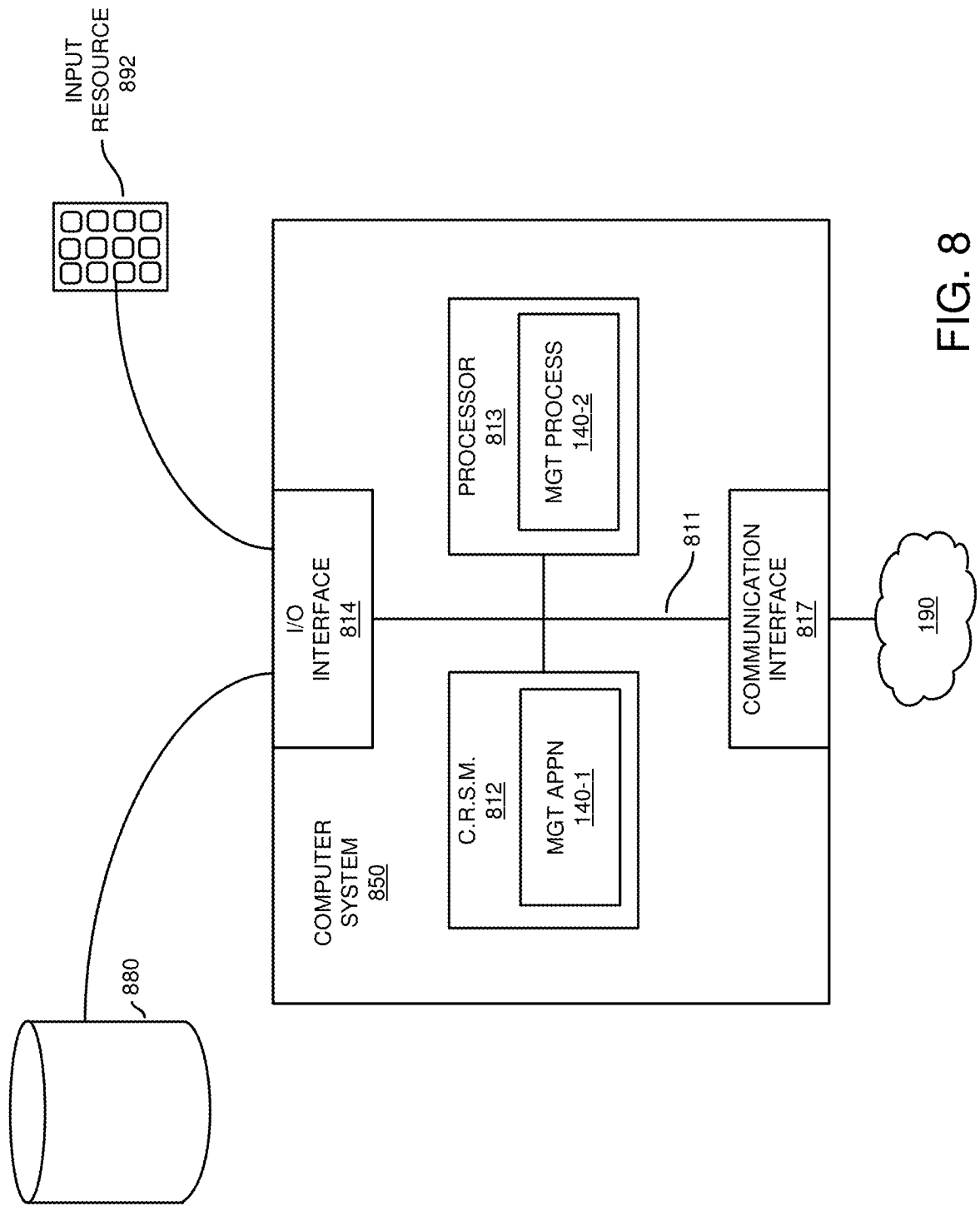
FIG. 8 is an example diagram illustrating example computer architecture operable to execute one or more operations according to embodiments herein.

FIG. 8 is an example block diagram of a computer system for implementing any of the operations as previously discussed according to embodiments herein.

Any of the resources (such as router device 125, analyzer resource 128, records management system 138, access control system 145, etc.) as discussed herein can be configured to include computer processor hardware, analog/digital circuitry, and/or corresponding executable instructions to carry out the different operations as discussed herein.

As shown, computer system 850 of the present example includes an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface(s) 814 supports connectivity to repository 870 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with management application 140-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in management application 140-1 stored on computer readable storage medium 812. Execution of the management application 140-1 produces management process 140-2 to carry out any of the operations and/or processes as discussed herein. Management application 140-1 can reside in any suitable resource such as router device 125, analyzer resource 128, records management system 138, access control system 145, etc.

Those skilled in the art will understand that the computer system 850 can include other processes and/or software and hardware components, such as an operating system that controls allocation and use of hardware resources to management application 140-1. In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 9 and 10. Note that the steps in the flowcharts below can be executed in any suitable order.

Figure 9:
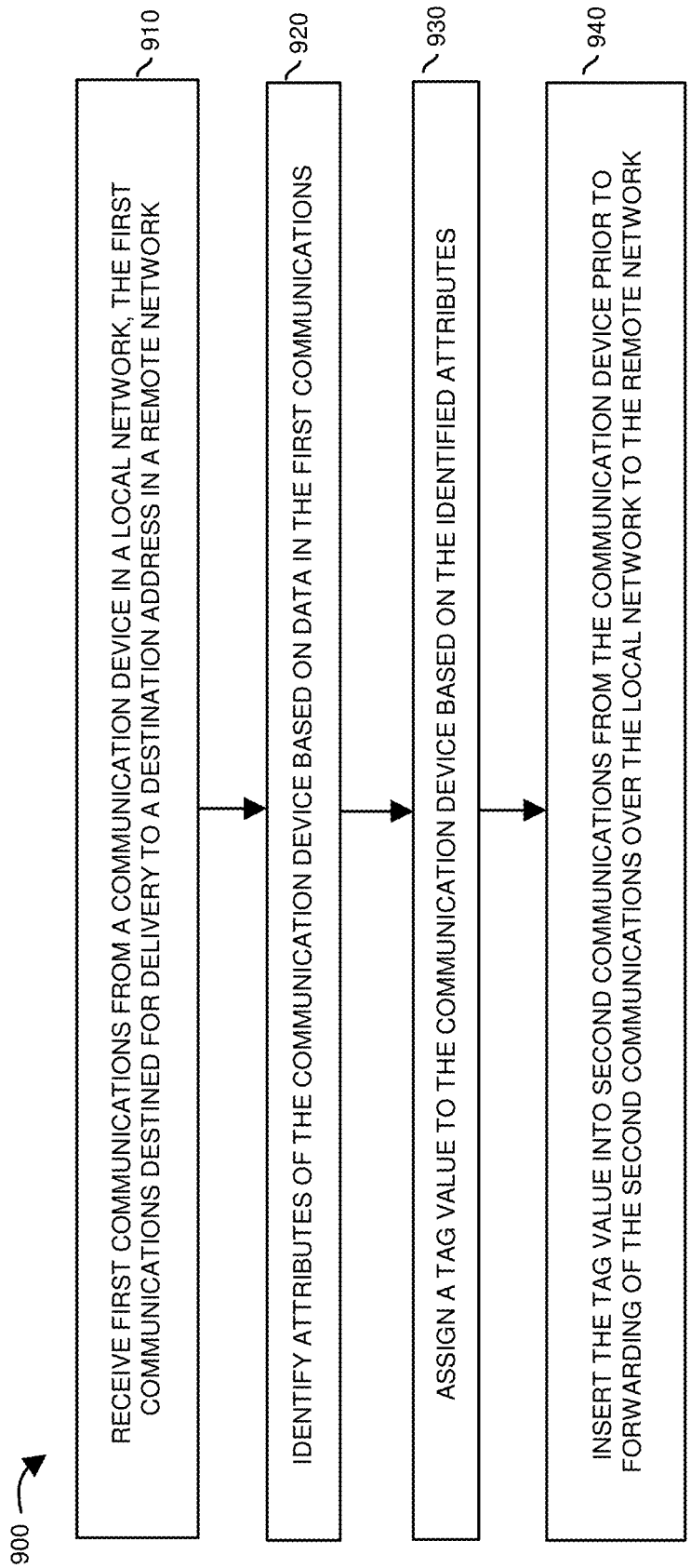
FIGS. 9 and 10 are example diagrams illustrating methods according to embodiments herein.

FIG. 9 is a flowchart 900 illustrating an example method according to embodiments herein. Note that there will be some overlap with respect to concepts as discussed above.

In processing operation 910, the router device 125 receives first communications from a communication device 120-1 in a local network of a subscriber domain 121. The first communications are destined for delivery to a destination address (such as AAAB) in a remote network 192.

In processing operation 920, the analyzer resource 128 identifies attributes of the communication device 120-1 based on data in the first communications.

In processing operation 930, the access control system 145 assigns a tag value M23 to the communication device 120-1 based on the identified attributes of the communication device 120-1.

In processing operation 940, the router device 125 inserts the tag value M23 into subsequent communications from the communication device 120-1 prior to forwarding of the communications over the local network 191 to the remote network 192.

Figure 10:
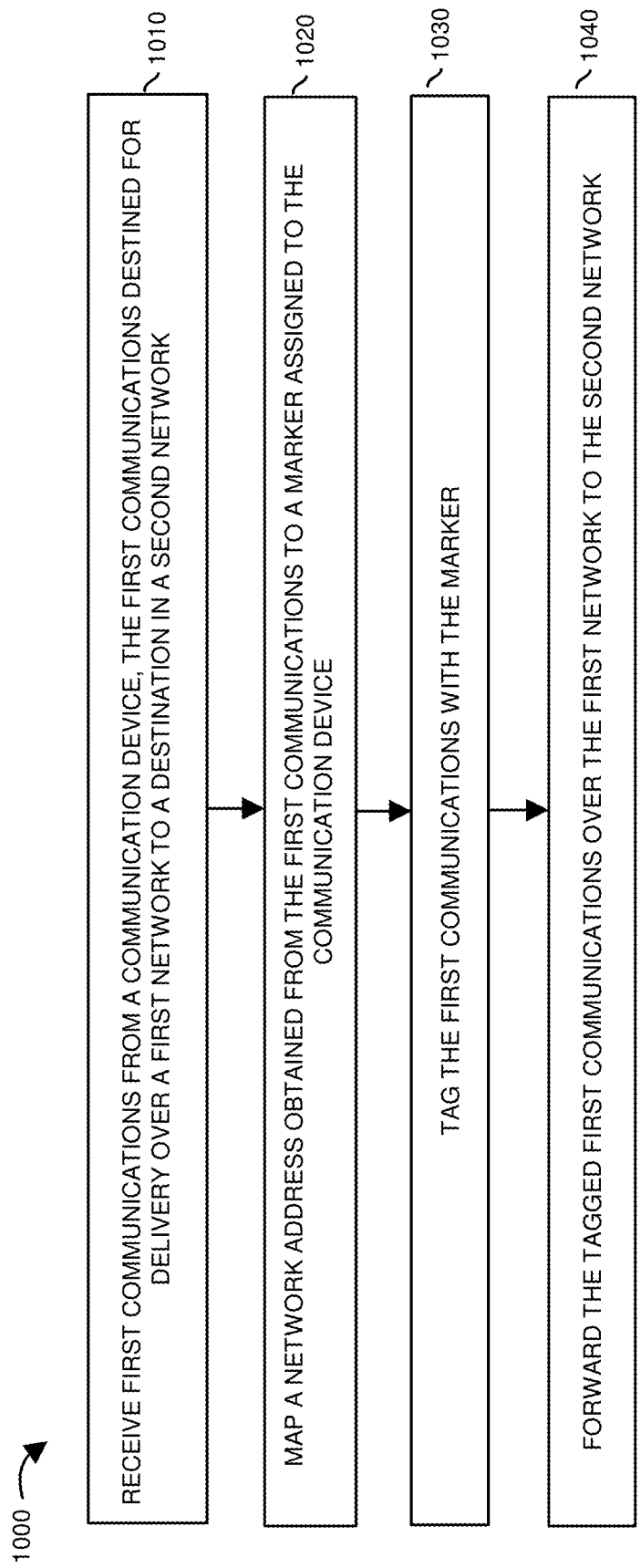

FIG. 10 is a flowchart 1000 illustrating an example method according to embodiments herein. Note that there will be some overlap with respect to concepts as discussed above.

In processing operation 1010, the router device 125 receives first communications from a communication device 120-1. The first communications 311-1 are destined for delivery over a first network 191 to a destination device 160-1 in a second network 192.

In processing operation 1020, the router device 125 uses map 135 to map a network address XXXY obtained from the first communications 311-1 to a marker M23 assigned to the communication device 120-1.

In processing operation 1030, the router device 125 tags the first communications 311-1 with the marker M23 to produce communications 311-2.

In processing operation 1040, the router device forwards the tagged first communications 311-2 (including marker M23) over the first network 191 to the second network 192. As previously discussed, the first network and corresponding router components provide a data flow service to the communication device 120-1 as indicated by the data delivery policy DDP23.

Note again that techniques herein are well suited to provide different data flow services to one or more communication devices in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    receiving first communications from a communication device, the first communications destined for delivery over a first network to a second network;
    retrieving a source identity value from the first communications, the source identity value indicating that the first communications originate from the communication device, the source identity value mapping to a marker assigned to the communication device;
    mapping the source identity value retrieved from the first communications to the marker assigned to the communication device;
    tagging the first communications with the marker; and
    forwarding the tagged first communications over the first network to the second network;
    wherein the marker maps to a corresponding data delivery policy, the method further comprising:
    conveying the tagged first communications over the first network in a manner as specified by the corresponding data delivery policy;
    wherein the second network ignores the marker in the tagged first communications during conveyance of the first communications through the second network, the method further comprising:
    receiving reply communications from a destination device in the second network, the destination device receiving the first communications, the reply communications generated by the destination device including the marker;
    wherein the first network conveys the reply communications to the communication device in a manner as specified by the corresponding data delivery policy associated with the marker, the method further comprising:
    intercepting request communications from the communication device to a server that assigns a network address to the communication device, the request communications communicated to the server prior to communication of the first communications;
    analyzing the intercepted request communications to identify attributes of the communication device; and
    selecting the marker and the corresponding data delivery policy based on the identified attributes of the communication device.

2. The method as in claim 1, wherein the first network includes a DOCSIS (Data Over Cable Service Interface Specification) communication system over which the tagged first communications are transmitted, the method further comprising:
    controlling conveyance of the tagged first communications over the DOCSIS communication system in a manner as specified by the corresponding data delivery policy.

3. The method as in claim 1 further comprising:
    conveying the reply communications over the first network in accordance with a data delivery policy as indicated by the marker.

4. The method as in claim 1, wherein mapping the source identity value obtained from the first communications to the marker assigned to the communication device further includes:
    identifying attributes of a type of communication link requested by the communication device; and selecting the marker from multiple available markers assigned to the communication device, the marker selected based at least in part on the identified attributes of the requested type of communication link.

5. The method as in claim 1, wherein the marker is a first marker assigned to the communication device, the first marker indicating a first data delivery policy initially assigned to the communication device, the method further comprising:
receiving a request to modify the marker assigned to the communication device; and
in response to receiving the request, mapping the communication device to a second marker instead of the first marker, the second marker indicating a second data delivery policy instead of the first data delivery policy to provide the communication device.

6. The method as in claim 1 further comprising:
in accordance with the corresponding data delivery policy assigned to the marker, controlling conveyance of the first communications over a first communication path and a second communication path between the communication device and the second network; and
wherein the first communication path is a wireless link between the communication device and a router device in the first network; and
wherein the second communication path extends between the router device and a gateway resource providing access to the second network.

7. The method as in claim 1, wherein the first communications include a destination identity value indicating the destination device to which the first communications are transmitted; and
wherein mapping the source identity value includes: independent of the destination identity value in the first communications, mapping only the source identity value to the marker assigned to the communication device.

8. The method as in claim 1, wherein the marker is a first marker assigned to the communication device, the first marker indicating a first data delivery policy initially assigned to the communication device, the method further comprising:
receiving a request to upgrade a delivery service provided to the communication device;
storing map information that provides a mapping between the first marker and the first data delivery policy; and
in response to receiving the request, modifying the map information, the modified map information mapping the source identity value of the communication device to a second data delivery policy instead of the first data delivery policy.

9. The method as in claim 8, wherein the first data delivery policy indicates a first bandwidth assigned to the communication device for conveyance of the communications associated with the communication device over the first network; and
wherein the second data delivery policy indicates a second bandwidth assigned to the communication device for conveyance of the communications associated with the communication device over the first network, the second bandwidth being greater than the first bandwidth.

10. The method as in claim 1, further comprising:
via the first network, conveying the reply communications to the communication device in a manner as specified by the corresponding data delivery policy.

11. The method as in claim 1 further comprising:
implementing fingerprinting techniques to identify attributes of the communication device; and
based on identified attributes, selecting the marker from multiple different markers.

12. The method as in claim 1 further comprising:
notifying the communication device of the marker assigned to the communication device.

13. The method as in claim 1, wherein the communication device generates the request communications to obtain a network address.

14. The method as in claim 1, wherein the marker is a first marker assigned to the communication device, the first marker assigned a first data rate in the first network; and
wherein a second marker is assigned to the communication device, the second marker assigned a second data rate in the first network.

15. The method as in claim 14, wherein the first communications are forwarded over the first network in accordance with the first data rate assigned to the first marker, the method further comprising:
tagging second communications from the communication device with the second marker; and
wherein the second communications are forwarded over the first network in accordance with the second data rate assigned to the second marker.

16. The method as in claim 1, wherein the marker is used by the first network to control delivery of the first communications; and
wherein the marker is not used by the second network to control delivery of the first communications.

17. A system comprising:
a local network, the local network providing multiple communication devices access to a remote network;
a router device disposed in the local network, the router device operable to:
receive first communications from a communication device, the first communications destined for delivery over a first network to a second network;
retrieve a source identity value from the first communications, the source identity value indicating that the first communications originate from the communication device, the source identity value mapping to a marker assigned to the communication device;
map the source identity value retrieved from the first communications to the marker assigned to the communication device;
tag the first communications with the marker; and
forward the tagged first communications over the first network to the second network;
wherein the marker maps to a corresponding data delivery policy, the router device further operative to:
convey the tagged first communications over the first network in a manner as specified by the corresponding data delivery policy;
wherein the second network is operative to ignore the marker in the tagged first communications during conveyance of the first communications through the second network, the router device further operative to:
receive reply communications from a destination device in the second network, the destination device receiving the first communications, the reply communications generated by the destination device including the marker;
wherein the first network conveys the reply communications to the communication device in a manner as specified by the corresponding data delivery policy associated with the marker, the router device further operative to:

intercept request communications from the communication device to a server that assigns a network address to the communication device, the request communications communicated to the server prior to communication of the first communications;

analyze the intercepted request communications to identify attributes of the communication device; and select the marker and the corresponding data delivery policy based on the identified attributes of the communication device.

18. The system as in claim 17, wherein the marker is a first marker assigned to the communication device, the first marker indicating a first data delivery policy initially assigned to the communication device, the router device further operable to:

receive a request from a user of the communication device to upgrade a respective data delivery policy assigned to the communication device;

assign a second marker to the communication device instead of the first marker;

in response to receiving the request to upgrade, map the communication device to the second marker, the second marker indicating a second data delivery policy instead of the first data delivery policy;

insert the second marker in second communications received from the communication device; and forward the second communications received from the communication device in accordance with the second data delivery policy.

19. Computer-readable storage hardware having instructions stored thereon, the instructions, when carried out by computer processor hardware, cause the computer processor hardware to:

receive first communications from a communication device, the first communications destined for delivery over a first network to a second network;

retrieve a source identity value from the first communications, the source identity value indicating that the first communications originate from the communication device, the source identity value mapping to a marker assigned to the communication device;

map the source identity value retrieved from the first communications to the marker assigned to the communication device;

tag the first communications with the marker; and forward the tagged first communications over the first network to the second network;

wherein the marker is a first marker assigned to the communication device, the first marker indicating a first data delivery policy initially assigned to the communication device, the communication processor hardware further operative to:

receive a request to upgrade a delivery service provided to the communication device;

store map information that provides a mapping between the first marker and the first data delivery policy; and in response to receiving the request, modify the map information, the modified map information mapping the source identity value of the communication device to a second data delivery policy instead of the first data delivery policy;

wherein the first data delivery policy indicates a first bandwidth assigned to the communication device for conveyance of the communications associated with the communication device over the first network; and wherein the second data delivery policy indicates a second bandwidth assigned to the communication device for conveyance of the communications associated with the communication device over the first network, the second bandwidth being greater than the first bandwidth; and wherein the second network ignores the marker in the tagged first communications during conveying of the tagged first communications through the second network.

20. A method comprising:

receiving first communications from a communication device, the first communications destined for delivery over a first network to a second network;

retrieving a source identity value from the first communications, the source identity value indicating that the first communications originate from the communication device, the source identity value mapping to a marker assigned to the communication device;

mapping the source identity value retrieved from the first communications to the marker assigned to the communication device:

tagging the first communications with the marker; and forwarding the tagged first communications over the first network to the second network;

wherein the marker is a first marker assigned to the communication device, the first marker indicating a first data delivery policy initially assigned to the communication device, the method further comprising:

receiving a request to upgrade a delivery service provided to the communication device;

storing map information that provides a mapping between the first marker and the first data delivery policy;

in response to receiving the request, modifying the map information, the modified map information mapping the source identity value of the communication device to a second data delivery policy instead of the first data delivery policy;

wherein the first data delivery policy indicates a first bandwidth assigned to the communication device for conveyance of the communications associated with the communication device over the first network;

wherein the second data delivery policy indicates a second bandwidth assigned to the communication device for conveyance of the communications associated with the communication device over the first network, the second bandwidth being greater than the first bandwidth; and wherein the second network is operative to ignore the marker in the tagged first communications during conveying of the tagged first communications through the second network.

21. A method comprising:

receiving first communications from a communication device, the first communications destined for delivery over a first network to a second network;

retrieving a source identity value from the first communications, the source identity value indicating that the first communications originate from the communication device, the source identity value mapping to a marker assigned to the communication device;

mapping the source identity value retrieved from the first communications to the marker assigned to the communication device;

tagging the first communications with the marker; and
forwarding the tagged first communications over the first network to the second network, the method further comprising:
intercepting a request communication from the communication device, the request communication transmitted from the communication device prior to the first communications;
analyzing the intercepted request communication to identify attributes of the communication device; and
selecting the marker and the corresponding data delivery policy based on the identified attributes of the communication device;
wherein the request communication is a request for assignment of a network address, the request communication transmitted from the communication device to a server resource that assigns a network address to the communication device, the method further comprising:
notifying the communication device of the marker assigned to the communication device.

* * * * *

UNITED STATES PATENT AND TRADEMARK OFFICE
CERTIFICATE OF CORRECTION

PATENT NO.       : 11,044,119 B2                                Page 1 of 1
APPLICATION NO.  : 16/024571
DATED            : June 22, 2021
INVENTOR(S)      : Christopher G. Turner and Andrew Ip It is certified that error appears in the above-identified patent and that said Letters Patent is hereby corrected as shown below:

In the Claims

Column 20, Line 25, Claim 20: delete ":" and insert -- ; --

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*